United States Patent
Chen et al.

(12) United States Patent (10) Patent No.: US 11,763,077 B1
(45) Date of Patent: Sep. 19, 2023

(54) UNIFORM PARSING OF CONFIGURATION FILES FOR MULTIPLE PRODUCT TYPES

(71) Applicant: EMC IP Holding Company LLC, Hopkinton, MA (US)

(72) Inventors: Ritong Chen, Boxborough, MA (US); Arun Kumar Obappa, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 604 days.

(21) Appl. No.: 15/802,550

(22) Filed: Nov. 3, 2017

(51) Int. Cl.
| | |
|---|---|
| G06F 40/221 | (2020.01) |
| G06F 8/41 | (2018.01) |
| G06F 9/54 | (2006.01) |
| G06F 40/149 | (2020.01) |
| H04L 51/48 | (2022.01) |

(52) U.S. Cl.
CPC .............. *G06F 40/221* (2020.01); *G06F 8/427* (2013.01); *G06F 9/546* (2013.01); *G06F 40/149* (2020.01); *H04L 51/48* (2022.05)

(58) Field of Classification Search
CPC ......... G06F 17/272; G06F 9/546; G06F 8/427; H04L 51/28; G06F 17/2258; G06F 40/221; G06F 40/149; G06F 16/1734; G06F 16/168; G06F 16/68; G06F 16/176; G06F 16/2365; G06F 16/24539; G06F 16/683; G06F 16/686; G06F 16/2465; G06F 16/248; G06F 16/27; G06F 16/14; G06F 16/164; G06F 16/2455; G06F 16/907; G06F 16/958

USPC .......................................................... 707/755
See application file for complete search history.

(56) References Cited

U.S. PATENT DOCUMENTS

| | | | | |
|---|---|---|---|---|
| 7,293,282 | B2* | 11/2007 | Danforth et al. ...... | H04L 63/08 713/168 |
| 7,672,985 | B2* | 3/2010 | Bookman et al. ..... | G06F 16/30 704/10 |
| 7,685,272 | B2* | 3/2010 | Bansod et al. ........ | G06F 11/008 709/224 |
| 7,738,640 | B1* | 6/2010 | Bajpay et al. ........ | H04M 15/48 379/114.04 |
| 8,732,101 | B1* | 5/2014 | Wilson et al. ..... | G06Q 30/0269 706/15 |
| 10,223,664 | B2* | 3/2019 | Gillen ............... | G06Q 10/0838 |

(Continued)

*Primary Examiner* — Yu Zhao
(74) *Attorney, Agent, or Firm* — Ryan, Mason & Lewis, LLP (57) ABSTRACT

A platform is provided for uniform parsing of configuration files for multiple product types. One method comprises obtaining, by a parser of a given product type, a given request from a message queue based on a metadata message of an incoming configuration file from a remote product of a given product type, wherein the message queue stores metadata messages for a plurality of product types; extracting information from the incoming configuration file based on product-specific business logic obtained from a table store comprising tables for the plurality of product types, wherein the business logic provides a mapping between information extracted from the incoming configuration file and destination database tables; and storing the contents in the destination database tables of a product-specific predefined database schema.

20 Claims, 7 Drawing Sheets

(56) References Cited

U.S. PATENT DOCUMENTS

| | | | |
|---|---|---|---|
| 2004/0139194 A1* | 7/2004 | Naganathan | H04L 43/0817 709/224 |
| 2006/0173865 A1* | 8/2006 | Fong | G06F 40/151 |
| 2006/0256367 A1* | 11/2006 | Wei | H04N 1/32635 358/1.15 |
| 2008/0073427 A1* | 3/2008 | Voigt | G06V 40/30 235/380 |
| 2008/0291486 A1* | 11/2008 | Isles et al. | G06Q 30/0236 358/1.15 |
| 2010/0293034 A1* | 11/2010 | Olejniczak et al. | G06Q 30/0631 705/14.45 |
| 2011/0161333 A1* | 6/2011 | Langseth et al. | G06F 16/254 707/755 |
| 2011/0202545 A1* | 8/2011 | Kawai et al. | G06F 16/24564 707/755 |
| 2012/0284690 A1* | 11/2012 | Blakeley et al. | G06F 8/60 717/120 |
| 2013/0162160 A1* | 6/2013 | Ganton et al. | H05B 45/20 315/210 |
| 2013/0218914 A1* | 8/2013 | Stavrianou et al. | G06F 16/3329 707/755 |
| 2014/0213233 A1* | 7/2014 | Parry et al. | H04W 8/245 455/418 |
| 2014/0280210 A1* | 9/2014 | Ritchie et al. | G06F 40/30 707/748 |
| 2015/0215253 A1* | 7/2015 | Vemuri et al. | H04L 51/12 709/206 |
| 2016/0299807 A1* | 10/2016 | Tanabe et al. | G06F 11/3013 |
| 2017/0142129 A1* | 5/2017 | Peng | H04L 47/72 |
| 2017/0230505 A1* | 8/2017 | McCarthy-Howe et al. | H04L 51/18 |
| 2017/0316517 A1* | 11/2017 | Shunock et al. | H04L 63/101 |
| 2018/0063140 A1* | 3/2018 | D et al. | G06F 21/41 |
| 2018/0241802 A1* | 8/2018 | Bernat et al. | H04L 43/0894 |
| 2019/0108579 A1* | 4/2019 | Chowdhary et al. | G06Q 30/0611 |

\* cited by examiner

INCOMING FILE ⸺ 200

```
<BetaLog version="1.0"><Symmetrix serialnumber="000123456789" time="06/14/2017 07:13:31">
<Drives ready="True"/>
<Env poweralarms="False"/>
<DA online="True" IOs="0"/>
<HA online="True" IOs="440"/>
<Errors scripterrors="Failed to read IOS on DAs;
c:\beta\Symm_Beta_Activity_Report_Kicker.bat does not exist, run batch job step is skipped!"/>
<OCC Number="9"/>
<ExistingSpares with_NR_bit_set="0"/>
<DeadDirectors exist="0"/>
<DD_Directors exist="0"/>
<ESRS Push_Mode="-1"/>
<syrfiles version="1.0.0"/>
<syrdos bat_version="1"/>
</Symmetrix>
</BetaLog>
```

FIG. 3

PRODUCT MESSAGE ⟵ 300

```
<?xml version="1.0" encoding="UTF-8"?>
<SYRRequest>
<FileID>887771260</FileID>
<DeviceType>PT1</DeviceType>
<SerialNumber>CKM00173400964</SerialNumber>
<RequestType>RT1</RequestType>
<FileType>Functional</FileType>
<FileURL>http://somedomain/RSC_CKM00123456_102517_043854000_syrfiles.zip<FileURL>
</SYRRequest>
```

FIG. 4

COMMON PARSER PROCESS

All parser services follow common business logic and components:

1. Publish Metadata of Incoming Files 110 to Message Queue 120 as a Message 300, which is Consumed by Shared Services to Generate Different Request Types for Different Products.

2. Appropriate Product Parser 155-i Locates its Own Requests Based on Product Types and Retrieves and Extracts Incoming Configuration File 110, based on its Request.

3. Appropriate Product Parser 155-i Validates Extracted Configuration File 110 based on Product-Specific Business Logic from Table 152-i and Updates Status of Request Being Processed.

4. Appropriate Product Parser 155-i Reads Configuration Contents from Extracted Configuration File 110 and Stores Them into Predefined Databased Schema Definition 175-i, which is Mapped to Configuration File Contents, via Database Transaction Module 160. Each Product Retrieves its Own Database Schema based on Individual Product Type.

5. Mark Status of Request as Completion

6. Send Alerts to Support Team and Roll Back Transaction if Errors Happen During Process.

UNIFORM PARSING OF CONFIGURATION FILES FOR MULTIPLE PRODUCT TYPES

FIELD

The field relates generally to the parsing of configuration files that are sent by remote products for analysis by support personnel.

BACKGROUND

Parsers interpret configuration and error reporting data from a variety of products, such as storage products, for reporting and/or analysis by support personnel of an enterprise. The configuration data and error reporting data are typically in the form of XML files, text files or binary files. The products are typically installed in a customer location and are configured to automatically send the configuration data to the provider of the product, for example, when a predefined event occurs or on a periodic basis (e.g., "send home" data collection techniques). The data generated by a parser is typically stored in a database for business users to, for example, analyze the health of a product, proactively address technical issues and/or predict issues that may occur in the future.

Most providers sell many products, each with unique configuration files and formats. A need exists for improved techniques for uniform parsing of product configuration files for multiple product types.

SUMMARY

In one embodiment, a platform is provided for uniform parsing of configuration files for multiple product types. An exemplary method comprises obtaining, by a parser of a given product type, based on the given product type, a given request of a given request type generated by a message consumer from a message queue based on a metadata message of an incoming configuration file from a remote product of the given product type, wherein the given request type corresponds to the given product type and the message queue stores metadata messages for a plurality of product types; extracting information from the incoming configuration file based on product-specific business logic that is specific to the given product type obtained from a table store comprising one or more tables for the plurality of product types, wherein the business logic provides a mapping between information extracted from the incoming configuration file and one or more destination database tables; and storing the contents in the one or more destination database tables of a product-specific predefined database schema table based on the product-specific business logic.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. Aspects of the disclosure provide methods and apparatus for uniform parsing of configuration files for multiple product types.

One or more aspects of the disclosure recognize that existing parsing techniques handle business logic in an inconsistent manner, across parsers of different products. Thus, existing parsing techniques often demonstrate significant code duplication and redundancy for the various parsers. Further, existing parsers were developed with mixed technologies, such as C#, VisualBasic and Java programming code, requiring support team members with different skillsets. Additional inefficiencies and/or inaccuracies result from the different workflows that parsers employ for different products, as well as the different techniques that are used to send the configuration files to the parsers, such as FTP (File Transport Protocol), the RabbitMQ open source message broker software, or an "extract, copy, purge" subprocess.

In one or more embodiments, a unified parsing process is provided for multiple products that follow substantially the same workflow, with one or more reusable modules and a common parsing algorithm.

Figure 1:
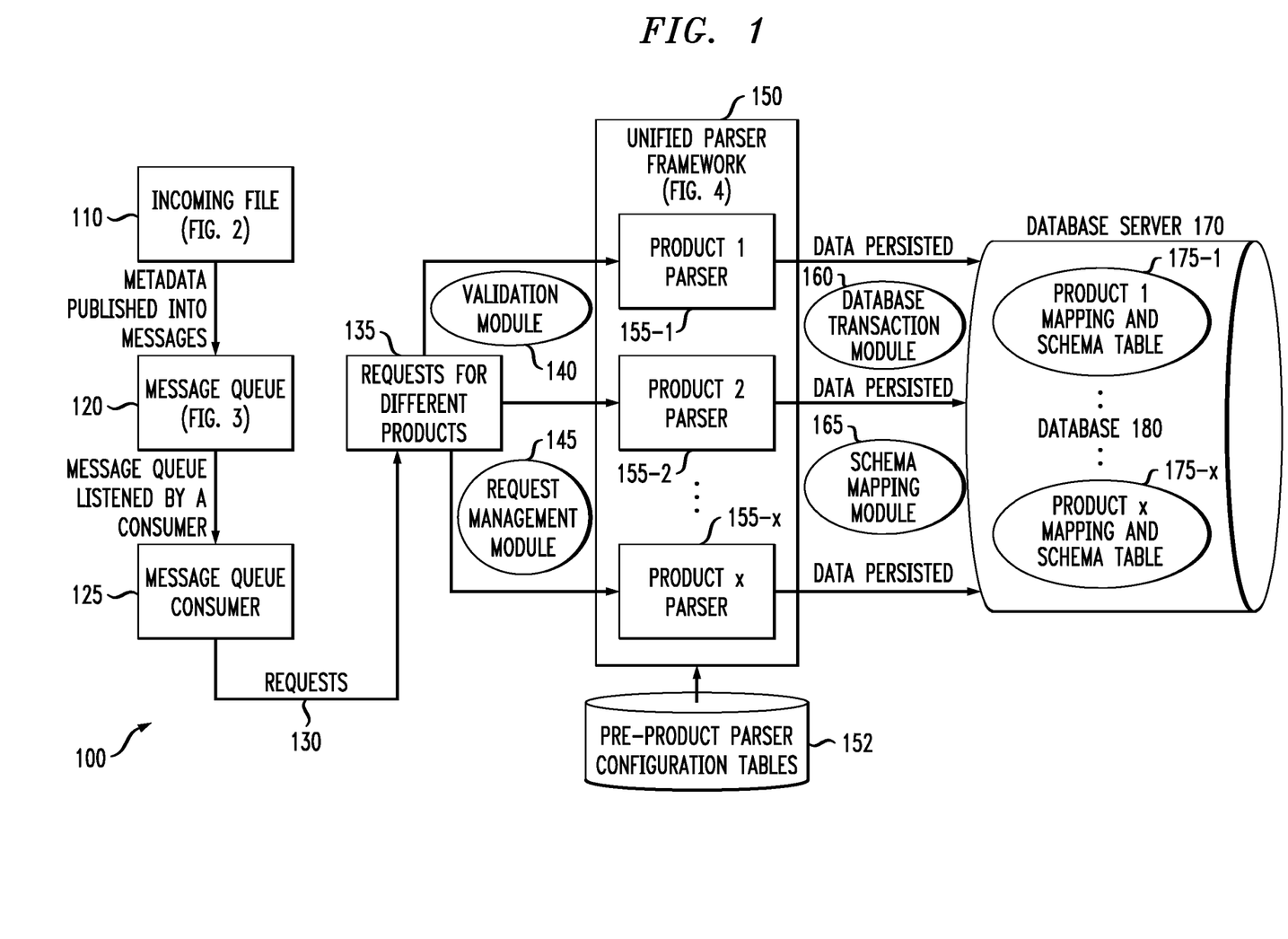
FIG. 1 illustrates a unified parsing system, according to one embodiment of the disclosure.

FIG. 1 illustrates a unified parsing system 100, according to one embodiment of the disclosure. As discussed hereinafter, the exemplary unified parsing system 100 comprises a common parsing platform comprising one or more processing modules that are employed by said plurality of product types. In one or more embodiments, the unified parsing system 100 of FIG. 1 provides a consistent workflow to unify parsing of multiple products with a common technology, such as the .NET platform from Microsoft, Corp. The unified parsing system 100 employs a table-driven approach that uses per-product grammar and configuration information to parse multiple products.

Figure 2:
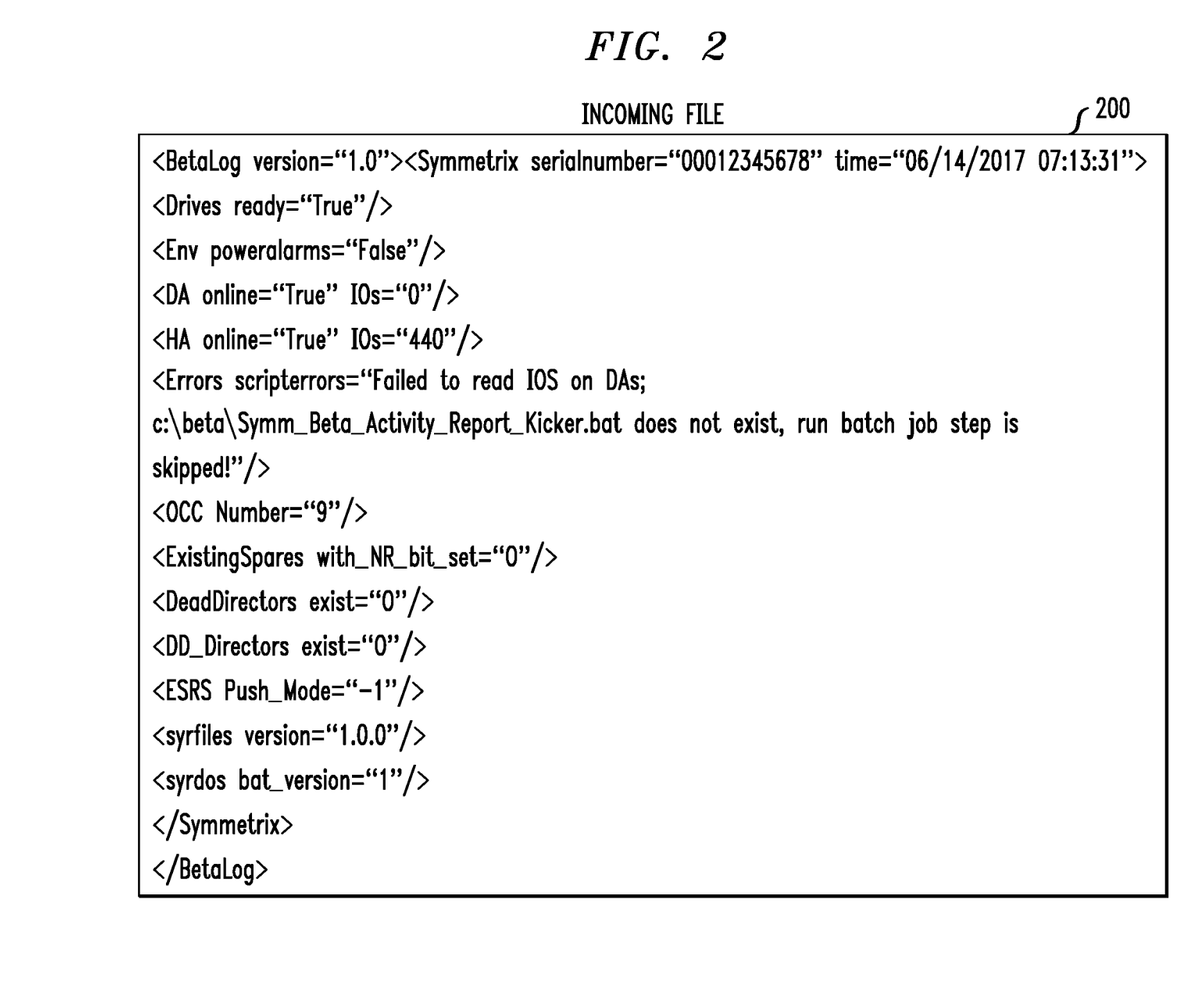
FIG. 2 illustrates an exemplary incoming file of FIG. 1, in further detail, that may be processed according to an embodiment of the disclosure.

As shown in FIG. 1, one or more incoming files 110, comprising product configuration files, as discussed further below in conjunction with FIG. 2, are received by the unified parsing system 100 from remote products (not shown). Metadata from the incoming files 110 is published into one or more messages that are stored in a message queue 120, as discussed further below in conjunction with FIG. 3, such as a RabbitMQ message queue.

One or more message queue consumers 125 monitor the message queue 120 to generate corresponding requests 130 that are collected as requests for different products 135. The requests 130 are further processed by a product-specific parser 155-*i* that is specific to the product type of a particular request 130, and identified from a plurality of product parsers 155-1 through 155-x of a unified parser framework 150, as discussed further below in conjunction with FIG. 4.

A validation module 140 validates the requests 130 based on product-specific business logic that is specific to the given product type and obtained from one or more per-product parser configuration tables 152 comprising one or more tables for the plurality of product types, discussed further below. A request management module 145 monitors and manages the requests 130.

The data extracted from the requests 130 is persistently stored in product-specific mapping and schema tables 175-1 through 175-x of a database 180 stored on one or more database servers 170, using a database transaction module 160 and a schema mapping module 165.

The exemplary per-product parser configuration tables 152 enable a table-driven parser approach. In this manner, if there is a change in the format or other aspects of a particular incoming file 110 of a particular product, only the corresponding table from the per-product parser configuration tables 152 is updated and not the code of the corresponding parser 155-i. Generally, the individual tables of the per-product parser configuration tables 152 specify the grammar and configuration that should be used to parse an incoming file 110 associated with a given product type and the mapping of the extracted data to a product-specific mapping and schema table 175-i in the database 180.

For example, in an exemplary embodiment, the per-product parser configuration tables 152 specify a starting location within an encoded version of the incoming file 110 (e.g., an XML configuration file) for extracting the desired information from the incoming file 110 for the corresponding product; (ii) one or more destination database table names identifying the appropriate product-specific mapping and schema table 175-i in the database 180 for the corresponding product; and (iii) a mapping between elements of the encoded version of the incoming file 110 and columns of the destination database tables the appropriate product-specific mapping and schema table 175-i in the database 180 for the corresponding product.

In one particular implementation of the per-product parser configuration table 152 for a particular product, a Source-Tags table indicates where to start parsing within the incoming file 110, such as an XML tag where the XPath evaluates from; a SourceTables table indicates where to send the extracted data, for example, by mapping the targeted table names of the appropriate product-specific mapping and schema table 175-i for the corresponding product; and a SourceColumns table provides a mapping between the source and destination by mapping between XML elements of the incoming file 110 and the database columns in the appropriate product- specific mapping and schema table 175-i for the corresponding product.

There are optionally other entries in the per-product parser configuration tables 152, for example, to indicate a product-specific archival routine for the given product type, lookup values or parent keys, and hexadecimal to decimal value conversion.

Although the per-product parser configuration tables 152 are shown in FIG. 1 as being distinct from the product-specific mapping and schema tables 175 stored in the database server 170, the per-product parser configuration tables 152 are optionally stored as part of the tables of the database 180.

The exemplary unified parser framework 150 employs an object-oriented design approach to implement inheritance and polymorphism for the various parsers 155. With the disclosed approach, products can still maintain their configuration uniqueness, with no business impact, but common modules within the unified parsing system 100 are generalized, as discussed hereinafter. In one or more embodiments, elements 120, 125, 135, 140, 145, 160 and 165 are employed by substantially all product types, and are tailored to the specific requirements of the corresponding product using the per-product rules from the per-product parser configuration tables 152. In this manner, the shared common modules include file management, parsing logic, validation, and request processing. An individual product parser 155-i is dynamically bound to its unique parsing routine, if there is any, at run time.

FIG. 2 illustrates an exemplary incoming file 200 (e.g., a configuration file), that may be processed according to an embodiment of the disclosure. The exemplary incoming file 200 is an XML structure. As noted above, the per-product parser configuration tables 152 identify, for the appropriate product parser 155-i, the portions of the exemplary incoming file 200 that should be extracted for storage in the appropriate product-specific mapping and schema table 175-i and the particular columns of the appropriate product-specific mapping and schema table 175-i for storing specific data items.

For example, the exemplary incoming file 200 is associated with a Symmetrix VMAX® storage array (product type), from Dell EMC, having a serial number of "00012345678." The exemplary incoming file 200 reports various statistics and parameters related to the particular Symmetrix device, at a particular time. In addition, the incoming file 200 of FIG. 2 reports one or more errors that will be processed and persisted by the product parser 155-i, into the appropriate product-specific mapping and schema table 175-i, for reporting and/or analysis.

The per-product parser configuration tables 152 may specify, for example, that the "0" value associated with the "ExistingSpares with NR _bit_set" parameter should be extracted and mapped to a particular column indicated for the product-specific mapping and schema table 175-i, for the respective product.

Figure 3:
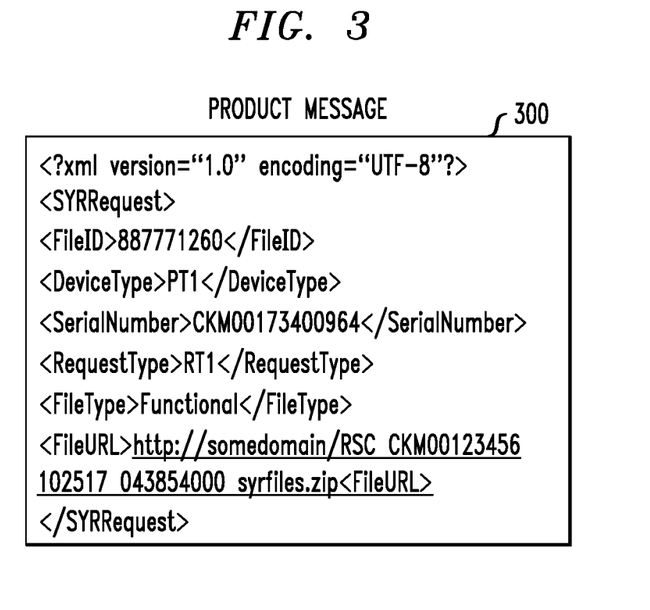
FIG. 3 illustrates an exemplary product message of FIG. 1, in further detail, that may be processed according to an embodiment of the disclosure.

FIG. 3 illustrates an exemplary product message 300, that may be processed according to an embodiment of the disclosure. As noted above, the incoming file 200 (for example, in an XML format) is stored as a message in message queue 120 and then converted to a request 130. The exemplary product message 300 of FIG. 3 identifies the device type and request type associated with the request, which is used to identify the particular parser 155-i that should process the product message 300.

In addition, the product message 300 of FIG. 3 identifies a file location (e.g., a File URL (uniform resource locator)) where the incoming file 200 is stored. The file location may be used, for example, by a message queue consumer 125 to access the incoming file 200 remotely.

Figure 4:
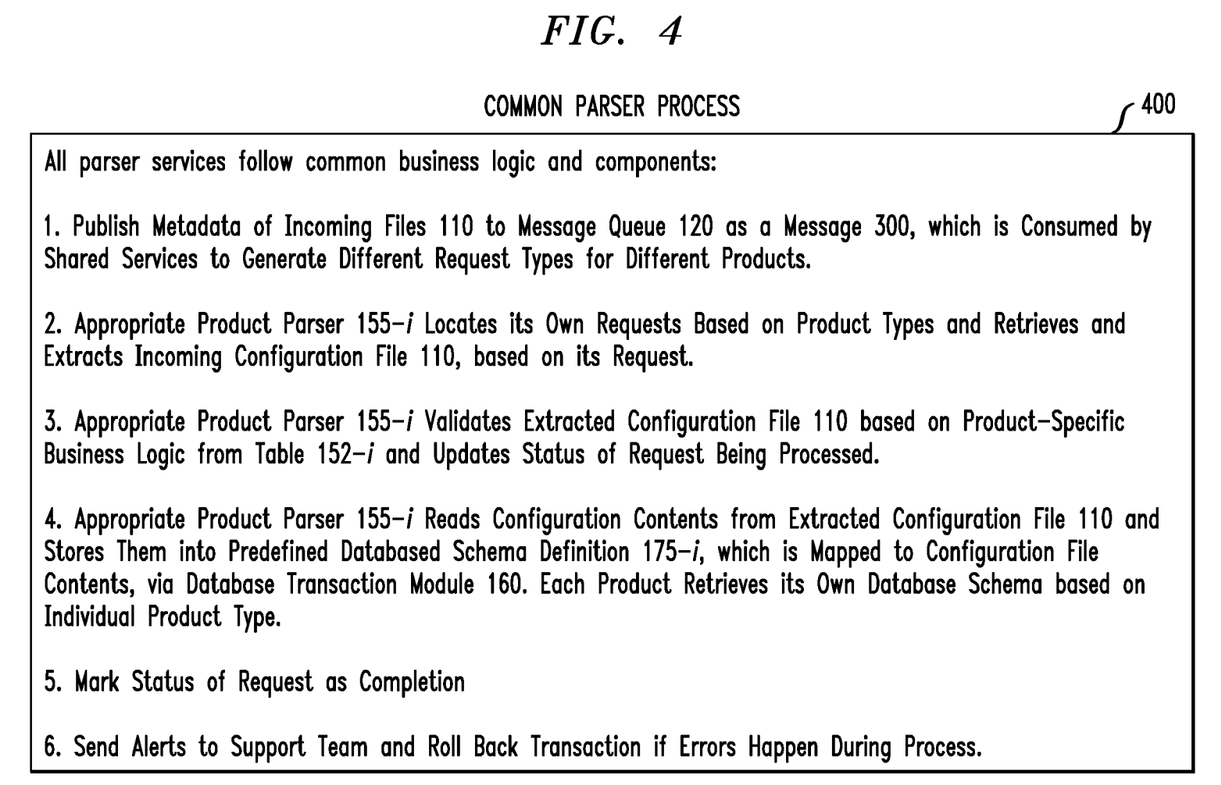
FIG. 4 illustrates exemplary pseudo code for a common parser process, according to one embodiment of the disclosure.

FIG. 4 illustrates exemplary pseudo code for a common parser process 400, according to one embodiment of the disclosure. As shown in FIG. 4, using the exemplary common parser process 400, the parsers 155 can follow common business logic and modules of the unified parsing system 100 of FIG. 1.

During step 1, the metadata of all incoming files 110 is published to a message queue 120, such as the RabbitMQ message queue, as a message. The message is consumed by shared services to generate different request types for different products.

During step 2, a product-specific parser 155-i locates requests 130 for its own product type, based on the product type specified in the requests 130. The product-specific parser 155-*i* also retrieves and extracts the incoming file 200 associated with the request 130, based on the request 130.

During step 3, the exemplary common parser process 400 performs validation, using validation module 140, based on the business logic in the per-product parser configuration tables 152, and indicates that the request is being processed.

During step 4, the product-specific parser 155-*i* reads the contents of the incoming file 200 and stores the contents into the predefined databased schema definition in the product-specific mapping and schema table 175-*i*, which is mapped to the configuration file contents, via the database transaction module 1660. As noted above, the product-specific parser 155-*i* retrieves its own database schema based on its individual product type.

During step 5, the request is marked as completed.

During step 6, alerts are optionally sent to the support team and the transaction is rolled back if errors occur during the common parser process 400.

Figure 5A:
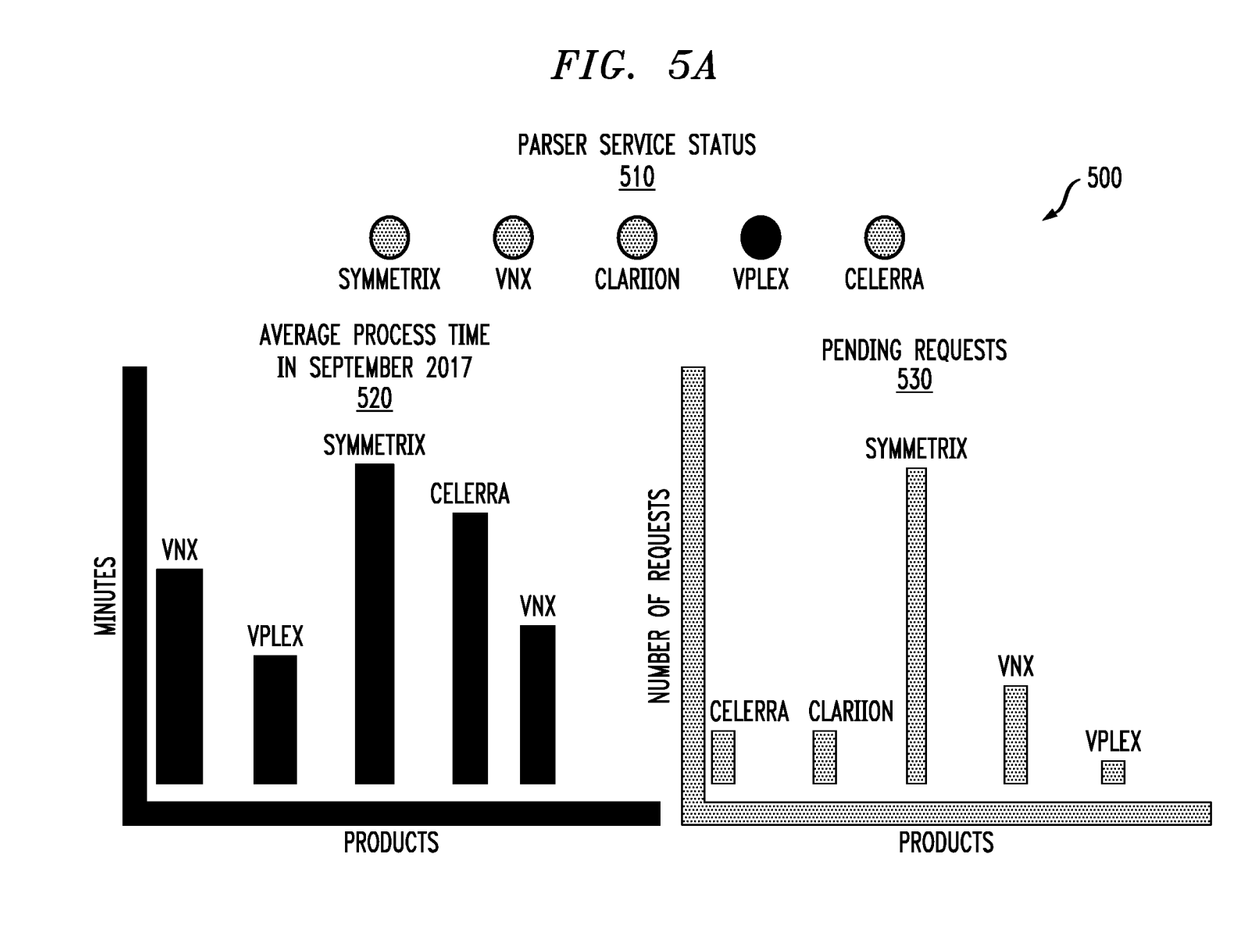
FIGS. 5A and 5B illustrate exemplary aspects of an administrative dashboard, according to one embodiment.
Figure 5B:
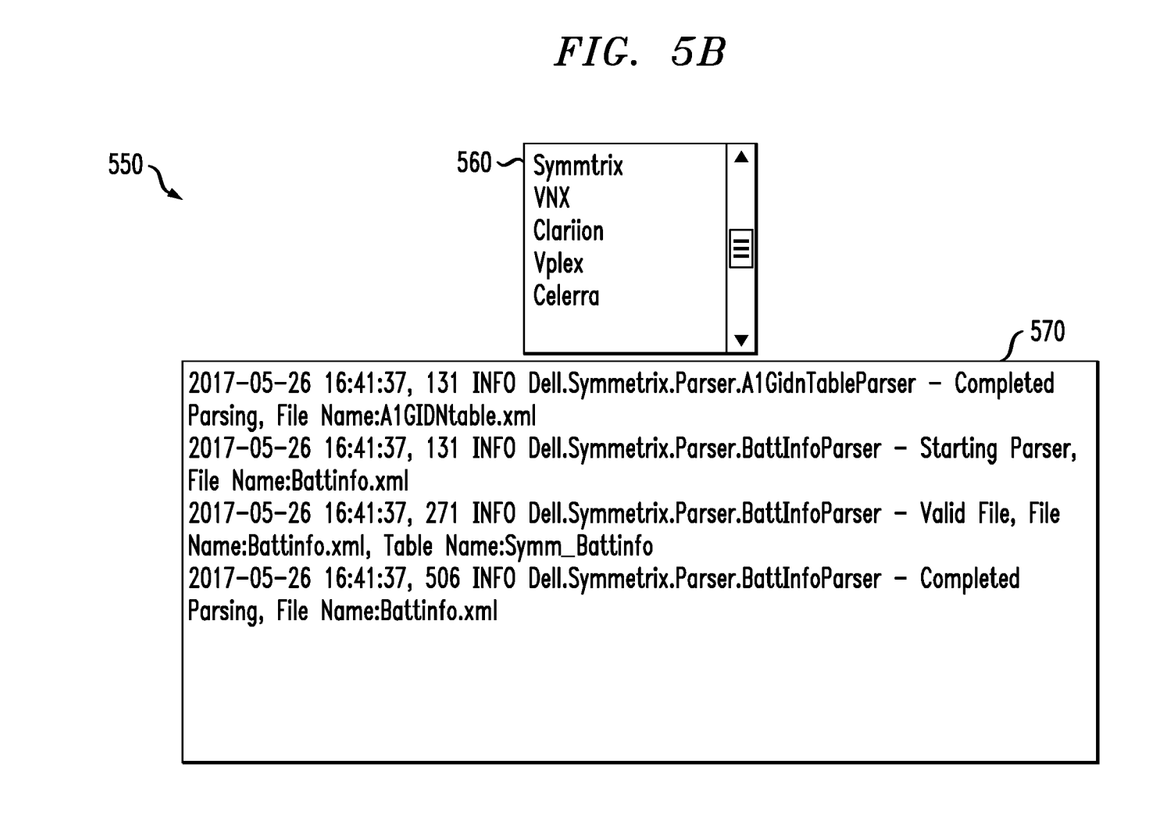

FIGS. 5A and 5B illustrate exemplary aspects of an administrative dashboard 500, according to one embodiment. Generally, the administrative dashboard 500 enables an administrator to monitor log data of the parsers 155 and to request statistics for data analysis.

As shown in FIG. 5A, the exemplary administrative dashboard 500 provides a status field 510 indicating the status (e.g., executing or suspended) of the respective parsers 155 for multiple storage products. The status information can be obtained, for example, by monitoring the timestamp of the log files of the parsers 155, to decide whether services are running.

In addition, the administrative dashboard 500 illustrates various statistics for the multiple storage products, such as an average processing time 520 for the multiple storage products for a particular time period, and a number of pending requests 530 for the multiple storage products (for example, number of pending requests to be processed, already processed and/or how long each request was processed and average processing time). In the example of FIG. 5A, the number of pending requests 530 for a representative Symmetrix product demonstrates a backlog. The information conveyed in the administrative dashboard 500 allows an administrator to allocate additional resources, such as additional processing devices, to alleviate the backlog, if desired.

In one or more embodiments, the administrative dashboard 500 connects to the log file of each parser 155, so that the administrator is able to view the log files and the service status of the various parsers 155 in real time.

FIG. 5B illustrates another portion (or view) 550 of the exemplary administrative dashboard 500. As shown in FIG. 5B, an administrator can select a particular parser 155-*i* from a list of parsers 560, to reveal the corresponding log files of the selected parser in a window 570.

Among other benefits, the disclosed techniques for uniform parsing of configuration files for multiple product types provide a unified parsing mechanism that is easier to support than conventional techniques, as the support team only needs one type of skillset to support the parsers for multiple products and to perform troubleshooting on one process. Since the parsing logic is table driven, in one or more embodiments, subsequent configuration changes only require an update of the schema mapping in the per-product parser configuration tables 152 without changes to the programming code.

The exemplary administrative dashboard 500 allows an administrator to monitor all services of the various parsers 155 using one consolidated place, and can perform a data analysis to resolve possible bottlenecks and improve parsing performance.

In addition, the disclosed unified parsing system and techniques improve process consistency and efficiency, and reduce operational expenses, by simplifying the workflow of the business process and reducing the number of breaking points.

Conclusion

One or more embodiments of the disclosure provide methods and apparatus for uniform parsing of configuration files for multiple product types. The foregoing applications and associated embodiments should be considered as illustrative only, and numerous other embodiments can be configured using the techniques disclosed herein, in a wide variety of different applications.

It should also be understood that the disclosed techniques for uniform parsing of configuration files for multiple product types, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed parsing techniques may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as unified parsing system 100, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a unified parsing platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux container (LXC). The containers may run on virtual machines in a multi-tenant environment, although other arrangements are possible. The containers may be utilized to implement a variety of different types of functionality within the unified parsing devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
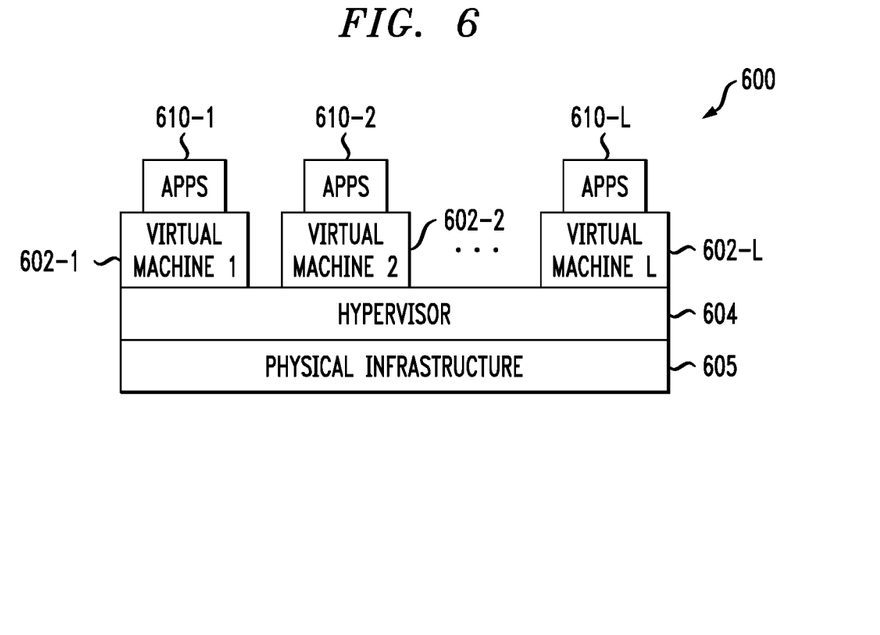
FIG. 6 illustrates an exemplary processing platform that may be used to implement at least a portion of one or more embodiments of the disclosure comprising a cloud infrastructure.

Referring now to FIG. 6, one possible processing platform that may be used to implement at least a portion of one or more embodiments of the disclosure comprises cloud infrastructure 600. The cloud infrastructure 600 in this exemplary processing platform comprises virtual machines (VMs) 602-1, 602-2, ... 602-L implemented using a hypervisor 604. The hypervisor 604 runs on physical infrastructure 605. The cloud infrastructure 600 further comprises sets of applications 610-1, 610-2, ... 610-L running on respective ones of the virtual machines 602-1, 602-2, ... 602-L under the control of the hypervisor 604.

The cloud infrastructure 600 may encompass the entire given system or only portions of that given system, such as one or more of client, servers, controllers, or computing devices in the system.

Although only a single hypervisor 604 is shown in the embodiment of FIG. 6, the system may of course include multiple hypervisors each providing a set of virtual machines using at least one underlying physical machine. Different sets of virtual machines provided by one or more hypervisors may be utilized in configuring multiple instances of various components of the system.

An example of a commercially available hypervisor platform that may be used to implement hypervisor 604 and possibly other portions of the system in one or more embodiments of the disclosure is the VMware® vSphere™ which may have an associated virtual infrastructure management system, such as the VMware® vCenter™. As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC of Hopkinton, Massachusetts. The underlying physical machines may comprise one or more distributed processing platforms that include storage products.

Particular types of storage products that can be used in implementing a given storage system of the unified parsing engine in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

As is apparent from the above, one or more of the processing modules or other components of the disclosed unified parsing apparatus may each run on a computer, server, storage device or other processing platform element. A given such element may be viewed as an example of what is more generally referred to herein as a "processing device." The cloud infrastructure 600 shown in FIG. 6 may represent at least a portion of one processing platform.

Figure 7:
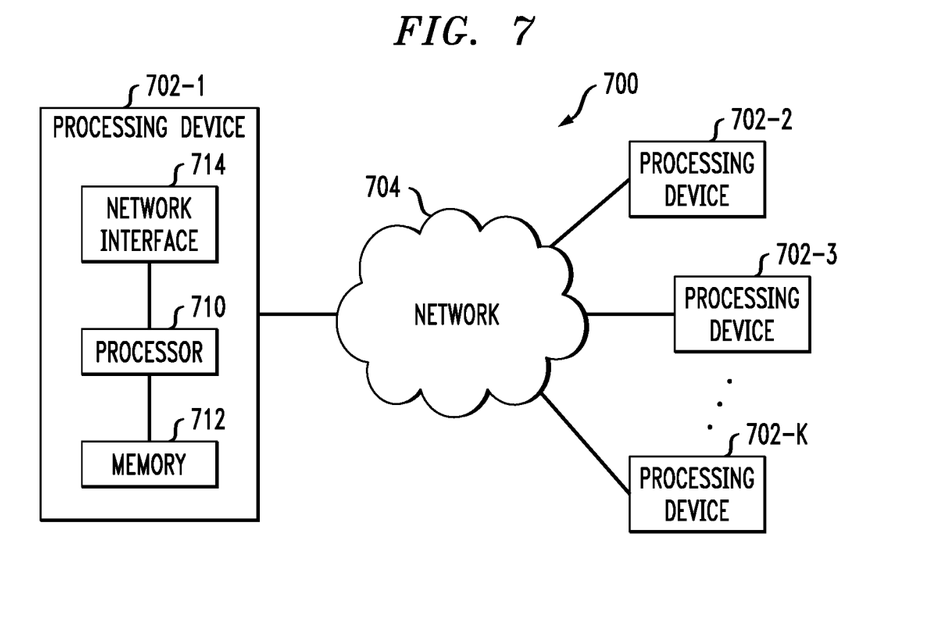
FIG. 7 illustrates another exemplary processing platform that may be used to implement at least a portion of one or more embodiments of the disclosure.

Another example of a processing platform is processing platform 700 shown in FIG. 7. The processing platform 700 in this embodiment comprises at least a portion of the given system and includes a plurality of processing devices, denoted 702-1, 702-2, 702-3, ... 702-K, which communicate with one another over a network 704. The network 704 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an application specific integrated circuit (ASIC), a field programmable gate array (FPGA) or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Multiple elements of unified parsing system 100 may be collectively implemented on a common processing platform of the type shown in FIGS. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of the flow charts and/or pseudo code shown in FIG. 4 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
locating and obtaining, by a parser of a given hardware product type, based on said given hardware product type, a given request of a given request type, wherein the given request is generated by a message consumer from a message queue based on a metadata message of an incoming product configuration file from a remote product of said given hardware product type, wherein said given request type corresponds to said given hardware product type and said message queue stores metadata messages for a plurality of hardware product types, wherein the incoming product configuration file comprises error reporting data related to the remote product for a particular time, wherein the parser is: (i) one of a plurality of parsers of a unified parser framework, each of the plurality of parsers corresponding to a different one of the plurality of hardware product types, and (ii) dynamically bound to a unique parsing routine at run time based on product-specific business logic that is specific to said given hardware product type;
extracting, by the parser of the given hardware product type, information corresponding to a portion of the error reporting data from the incoming product configuration file based on the unique parsing routine of the parser, wherein the unique parsing routine comprises a set of rules for mapping the extracted information that: (i) is obtained from a first database comprising a respective set of rules for each of the plurality of hardware product types, and (ii) maps information extracted from the incoming product configuration file to one or more destination database tables in a second database, according to a predefined database schema specified for the given hardware product type, wherein the set of rules comprises two or more of: at least one location of at least one portion of an encoded version of the incoming product configuration file from which to start extracting the information, one or more destination database table names, and a mapping between elements of the encoded version and fields of the one or more destination database tables;
storing the extracted information in the one or more destination database tables of the second database according to the one or more destination database table names and the mapping identified in the set of rules;
displaying a parsing dashboard that provides log data and statistics of the parser of the given hardware product type, the log data and statistics comprising two or more of: a number of pending requests associated with the remote product, a number of processed requests associated with the remote product, and an average processing time of each processed request associated with the remote product; and
adjusting a configuration of the parser of the given hardware product type based on at least a portion of the log data and statistics.

2. The method of claim 1, wherein said method employs a common parsing platform comprising one or more processing modules that are employed by said plurality of hardware product types.

3. The method of claim 1, further comprising the step of updating a status of the given request as one or more of being processed and completed.

4. The method of claim 1, further comprising the step of sending one or more alerts to a support team in response to said given request.

5. The method of claim 1, further comprising the step of obtaining a product-specific archival routine for said given hardware product type.

6. The method of claim 1, wherein at least one of the plurality of hardware product types corresponds to a storage array.

7. The method of claim 1, wherein the encoded version of the incoming product configuration file comprises an extensible markup language (XML) file, and wherein the at least one location corresponds to at least one XML tag.

8. The method of claim 1, wherein the adjusting is performed without changing computer program code of the parser.

9. A system, comprising: a memory; and
at least one processing device, coupled to the memory, operative to implement the following steps:
locating and obtaining, by a parser of a given hardware product type, based on said given hardware product type, a given request of a given request type, wherein the given request is generated by a message consumer from a message queue based on a metadata message of an incoming product configuration file from a remote product of said given hardware product type, wherein said given request type corresponds to said given hardware product type and said message queue stores metadata messages for a plurality of hardware product types, wherein the incoming product configuration file comprises error reporting data related to the remote product for a particular time, wherein the parser is: (i) one of a plurality of parsers of a unified parser framework, each of the plurality of parsers corresponding to a different one of the plurality of hardware product types, and (ii) dynamically bound to a unique parsing routine at run time based on product-specific business logic that is specific to said given hardware product type;
extracting, by the parser of the given hardware product type, information corresponding to a portion of the error reporting data from the incoming product configuration file based on the unique parsing routine of the parser, wherein the unique parsing routine comprises a set of rules for mapping the extracted information that: (i) is obtained from a first database comprising a respective set of rules for each of the plurality of hardware product types, and (ii) maps information extracted from the incoming product configuration file to one or more destination database tables in a second database, according to a predefined database schema specified for the given hardware product type, wherein the set of rules comprises two or more of: at least one location of at least one portion of an encoded version of the incoming product configuration file from which to start extracting the information, one or more destination database table names, and a mapping between elements of the encoded version and fields of the one or more destination database tables;
storing the extracted information in the one or more destination database tables of the second database according to the one or more destination database table names and the mapping identified in the set of rules;
displaying a parsing dashboard that provides log data and statistics of the parser of the given hardware product type, the log data and statistics comprising two or more of: a number of pending requests associated with the remote product, a number of processed requests associated with the remote product, and an average processing time of each processed request associated with the remote product; and
adjusting a configuration of the parser of the given hardware product type based on at least a portion of the log data and statistics.

10. The system of claim 9, wherein said at least one processing device employs a common parsing platform comprising one or more processing modules that are employed by said plurality of hardware product types.

11. The system of claim 9, further comprising the step of sending one or more alerts to a support team in response to said given request.

12. The system of claim 9, further comprising the step of: obtaining a product-specific archival routine for said given hardware product type.

13. The system of claim 9, wherein at least one of the plurality of hardware product types corresponds to a storage array.

14. The system of claim 9, wherein the encoded version of the incoming product configuration file comprises an extensible markup language (XML) file, and wherein the at least one location corresponds to at least one XML tag.

15. The system of claim 9, wherein the adjusting is performed without changing computer program code of the parser.

16. A computer program product, comprising a tangible machine-readable storage medium having encoded therein executable code of one or more software programs, wherein the one or more software programs when executed by at least one processing device perform the following steps:
locating and obtaining, by a parser of a given hardware product type, based on said given hardware product type, a given request of a given request type, wherein the given request is generated by a message consumer from a message queue based on a metadata message of an incoming product configuration file from a remote product of said given hardware product type, wherein said given request type corresponds to said given hardware product type and said message queue stores metadata messages for a plurality of hardware product types, wherein the incoming product configuration file comprises error reporting data related to the remote product for a particular time, wherein the parser is: (i) one of a plurality of parsers of a unified parser framework, each of the plurality of parsers corresponding to a different one of the plurality of hardware product types, and (ii) dynamically bound to a unique parsing routine at run time based on product-specific business logic that is specific to said given hardware product type;
extracting, by the parser of the given hardware product type, information corresponding to a portion of the error reporting data from the incoming product configuration file based on the unique parsing routine of the parser, wherein the unique parsing routine comprises a set of rules for mapping the extracted information that: (i) is obtained from a first database comprising a respective set of rules for each of the plurality of hardware product types, and (ii) maps information extracted from the incoming product configuration file to one or more destination database tables in a second database, according to a predefined database schema specified for the given hardware product type, wherein the set of rules comprises two or more of: at least one location of at least one portion of an encoded version of the incoming product configuration file from which to start extracting the information, one or more destination database table names, and a mapping between elements of the encoded version and fields of the one or more destination database tables;

storing the extracted information in the one or more destination database tables of the second database according to the one or more destination database table names and the mapping identified in the set of rules;

displaying a parsing dashboard that provides log data and statistics of the parser of the given hardware product type, the log data and statistics comprising two or more of: a number of pending requests associated with the remote product, a number of processed requests associated with the remote product, and an average processing time of each processed request associated with the remote product; and adjusting a configuration of the parser of the given hardware product type based on at least a portion of the log data and statistics.

17. The computer program product of claim 16, wherein said one or more software programs employ a common parsing platform comprising one or more processing modules that are employed by said plurality of hardware product types.

18. The computer program product of claim 16, wherein at least one of the plurality of hardware product types corresponds to a storage array.

19. The computer program product of claim 16, wherein the encoded version of the incoming product configuration file comprises an extensible markup language (XML) file, and wherein the at least one location corresponds to at least one XML tag.

20. The computer program product of claim 16, wherein the adjusting is performed without changing computer program code of the parser.

\* \* \* \* \*